(12) United States Patent
Saito et al.

(10) Patent No.: US 7,164,553 B2
(45) Date of Patent: Jan. 16, 2007

(54) MAGNETIC RECORDING AND REPRODUCTION APPARATUS

(75) Inventors: Yoshiyuki Saito, Osaka (JP); Koichiro Hirabayashi, Osaka (JP); Hiroshi Kurumatani, Hyogo (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 486 days.

(21) Appl. No.: 10/807,825

(22) Filed: Mar. 24, 2004

(65) Prior Publication Data

US 2004/0207948 A1    Oct. 21, 2004

(30) Foreign Application Priority Data

Mar. 27, 2003    (JP)    ............................. 2003-088423

(51) Int. Cl.
G11B 15/665    (2006.01)

(52) U.S. Cl. ........................................................ 360/85

(58) Field of Classification Search ................ 360/85, 360/95, 96.5; 242/332, 334
See application file for complete search history.

(56) References Cited

U.S. PATENT DOCUMENTS 5,204,791 A * 4/1993 Konishi et al. ............... 360/95
5,227,933 A * 7/1993 Konishi et al. ............... 360/85
5,430,585 A * 7/1995 Takada et al. ................ 360/85
5,535,071 A * 7/1996 Yamagishi et al. ......... 360/96.5
5,825,583 A * 10/1998 Kang et al. ................... 360/85

* cited by examiner

*Primary Examiner*—Angel Castro
(74) *Attorney, Agent, or Firm*—Renner, Otto, Boisselle, & Sklar, LLP

(57) ABSTRACT

A magnetic recording and reproduction apparatus includes a main chassis having a rotatable head cylinder provided thereon; and a sub chassis on which a tape cassette is mountable. The sub chassis is movable relative to the main chassis. A pivotable body is provided on the main chassis. The pivotable body has a projection provided thereon. The projection is engaged with a cam groove in the sub chassis so as to pivot the pivotable body. Thus, the cam groove is restricted by the projection, so that the sub chassis moves with respect to the main chassis. The cam groove has a width substantially identical to the diameter of the projection. The cam groove includes first and second arc portions continuous with each other, and a straight portion continuous with the second arc portion. The first and second arc portions have identical radii, and are projected in opposite directions.

4 Claims, 9 Drawing Sheets

MAGNETIC RECORDING AND REPRODUCTION APPARATUS

This non-provisional application claims priority under 35 U.S.C., §119(a), on Patent Application No. 2003-088423 filed in Japan on Mar. 27, 2003, the entire contents of which are hereby incorporated by reference.

BACKGROUND OF THE INVENTION

1. Field of the Invention

The present invention relates to a magnetic recording and reproduction apparatus, and in particular to a magnetic recording and reproduction apparatus having a mechanism for moving a sub chassis relative to a main chassis.

2. Description of the Related Art

Recently, in the field of magnetic recording and reproduction apparatuses, the reduction of the number of components and the simplification of the structure has been actively pursued in addition to further reduction of size. Especially, a loading mechanism is very complicated and thus tends to have a larger number of components. Since the size and the number of components of the loading mechanism significantly influence the size and the cost of the video tape recorder itself, the development of the loading mechanism is very important.

A major part of the loading mechanism is a mechanism for driving a sub chassis. The development of this mechanism is very important.

Hereinafter, a conventional magnetic recording and reproduction apparatus will be described.

One known conventional magnetic recording and reproduction apparatus is described in Japanese Laid-Open Publication No. 11-328773. A loading mechanism of the magnetic recording and reproduction apparatus, especially a sub chassis driving mechanism, is shown in FIGS. 1, 3, and 24 through 30 of Japanese Laid-Open Publication No. 11-328773.

FIG. 1 of Japanese Laid-Open Publication No. 11-328773 is a plan view of a sub chassis driving mechanism of the magnetic recording and reproduction apparatus in a tape cassette mountable position (unloading mode). A sub chassis 3 is movable with respect to the main chassis 8. A sub chassis driving arm (not shown) on the main chassis 8 has a sub chassis driving pin 92 provided thereon, and the sub chassis driving pin 92 is in engagement with a groove 108 in the sub chassis 3.

FIG. 3 of Japanese Laid-Open Publication No. 11-328773 is a plan view of the mechanism shown in FIG. 1 (unloading mode) except that the sub chassis 3 is not shown. FIG. 3 is provided for illustrating a structure of the main chassis 8. A cam gear 66 is driven by a motor (not shown) mounted on the main chassis 8 to pivot about a support shaft 67. A sub chassis driving pin 75 is provided on a bottom surface of the cam gear 66. The sub chassis driving arm (represented by reference numeral 89 in FIG. 3) is engaged with the sub chassis driving pin 75. The engagement pivots the sub chassis driving arm 89 about a support shaft 90 as the cam gear 66 pivots. A sub chassis driving pin 92 is provided at a tip of the sub chassis driving arm 89.

With reference to FIGS. 24 through 30 of Japanese Laid-Open Publication No. 11-328773, an operation of the sub chassis driving arm 89 will be described.

FIG. 24 of Japanese Laid-Open Publication No. 11-328773 shows the positional relationship between the sub chassis driving arm 89 and the sub chassis driving pin 75 provided on the cam gear 66 (not shown in FIG. 24) when the magnetic recording and reproduction apparatus is in the unloading mode (tape cassette mountable position). The sub chassis driving pin 75 is engaged with a cam portion opening 91 including a first arc portion 121, a second arc portion 130, and a recessed portion 127. In this state, the sub chassis driving pin 75 is specifically engaged with the first arc portion 121.

From the state shown in FIG. 24, the cam gear pivots counterclockwise about the support shaft 67 to place the magnetic recording and reproduction apparatus into a state shown in FIG. 25. Since the sub chassis driving pin 75 is still in engagement with the first arc 121, the sub chassis driving arm 89 has not started pivoting about the support shaft 90 and the sub chassis engaged with the sub chassis driving pin 75 has not moved.

The cam gear further pivots counterclockwise about the support shaft 67 to place the magnetic recording and reproduction apparatus into a state shown in FIG. 26. In this state, the sub chassis driving pin 75 is released from the engagement with the first arc portion 121 and goes into engagement with the recessed portion 127. The sub chassis driving arm 89 starts pivoting about the support shaft 90, and the sub chassis engaged with the sub chassis driving pin 75 starts moving. After this, in accordance with the pivoting of the cam gear, the sub chassis driving arm 89 pivots counterclockwise about the support shaft 90, and the sub chassis also moves accordingly. When the sub chassis driving arm 89 arrives at a prescribed position, the sub chassis driving pin 75 is released from the engagement with the recessed portion 127 as shown in FIG. 27 of Japanese Laid-Open Publication No. 11-328773. In this state, the sub chassis driving pin 75 is in engagement with the second arc portion 130. Even though the cam gear pivots counterclockwise, the sub chassis driving arm 89 does not pivot and the sub chassis does not move. Only the sub chassis driving pin 75 moves in the second arc portion 130 as shown in FIGS. 28 through 30 of Japanese Laid-Open Publication No. 11-328773. As described above, the cam gear 66 is engaged with the sub chassis driving arm 89 having the cam portion opening 91 which has a size significantly larger than the diameter of the sub chassis driving pin 75. Thus, the sub chassis 3 is moved by the engagement of the cam portion opening 91 and the sub chassis driving pin 75 provided on the sub chassis driving arm 89.

In the above structure, only one side of the sub chassis driving arm 89 la engaged with the sub chassis driving pin 75, and the sub chassis driving pin 75 has a large separation from the far side of the cam portion opening 91 of the sub chassis driving arm 89. Accordingly, the position of the sub chassis driving arm 89 is not uniquely determined with respect to the sub chassis driving pin 75. Thus, the operation of the sub chassis driving arm 89 is unstable.

The conventional magnetic recording and reproduction apparatus described above has the following problems. As mentioned above, the position of the sub chassis driving arm 89 is not uniquely determined with respect to the sub chassis driving pin 75, and the operation of the sub chassis driving arm 89 is unstable. When an abnormal force is applied to the sub chassis driving arm 89, the sub chassis driving mechanism has a reliability problem. In addition, since the pivoting force of the cam gear 66 is first conveyed to the sub chassis driving arm 89 and then conveyed to the sub chassis 3, the number of components is increased. This hinders cost, size and weight reduction and also deteriorates the driving efficiency due to friction, increasing the load on the motor acting as a driving source. Since a plurality of components including the sub chassis driving arm 89 are located below the cam gear 66, the mechanism inevitably becomes thick. A large area in which the sub chassis driving arm 89 pivots also increases the size of the main chassis 8. These factors also hinder size and weight reduction.

SUMMARY OF THE INVENTION

A magnetic recording and reproduction apparatus according to the present invention includes a main chassis having a rotatable head cylinder provided thereon; and a sub chassis on which a tape cassette is mountable. The sub chassis is movable with respect to the main chassis between a tape cassette mountable position and a tape pull-out completion position, and the tape cassette mountable position is a position at which the tape cassette is mountable on the sub chassis and the tape pull-out completion position is a position at which information recording to, and information reproduction from, the tape which has been pulled out from the tape cassette and wound around the rotatable head cylinder can be performed. A pivotable body is provided on the main chassis; the pivotable body has a projection provided thereon; and the projection on the pivotable body is engaged with a cam groove in the sub chassis so as to pivot the pivotable body, and thus the cam groove is restricted by the projection on the pivotable body, so that the sub chassis moves with respect to the main chassis. The cam groove has a width which is substantially identical to the diameter of the projection on the pivotable body. The cam groove includes a first arc portion, a second arc portion continuous with the first arc portion, and a straight portion continuous with the second arc portion; and the first arc portion and the second arc portion have an identical radius, and are projected in opposite directions to each other.

In one embodiment of the invention, when the sub chassis is at the tape cassette mountable position, the projection is engaged with the first arc portion; when the sub chassis is at the tape pull-out completion position, the projection is engaged with the second arc portion; and when the sub chassis is between the tape cassette mountable position and the tape pull-out completion position, the projection is engaged with one of the straight portion and the second arc portion.

In one embodiment of the invention, a radius of an arc passing through the center of the first arc portion in the circumferential direction thereof, a radius of an arc passing through the center of the second arc portion in the circumferential direction thereof, and a radius of an arc drawn by the center of the projection on the pivotable body when the projection on the pivotable body moves about the center of the pivotable body, are identical to each other.

In one embodiment of the invention, when the projection is at a tape cassette take-out position, the projection is engaged with the first arc portion at a first position of the first arc portion, and when the projection is at a tape cassette insertable position, the projection is engaged with the first arc portion at a second position of the first arc portion which is different from the first position of the first arc portion. When the projection is at a tape running position, the projection is engaged with the second arc portion at a first position of the second arc portion, and when the projection is at a stop position, the projection is engaged with the second arc portion at a second position of the second arc portion which is different from the first position of the second arc portion.

Thus, the invention described herein makes possible the advantages of providing a magnetic recording and reproduction apparatus including a high performance sub chassis driving mechanism which has a simpler structure, a reduced weight and size and a smaller number of components, and operates stably with a reduced load on a motor. The simpler structure of the sub chassis driving mechanism is realized by engaging a projection on the cam gear directly with a cam groove in the sub chassis and also forming the cam groove with a specific shape.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to FIGS. 1 through 9.

A magnetic recording and reproduction apparatus includes a main chassis and a sub chassis. Namely, the magnetic recording and reproduction apparatus according to the present invention has a two-chassis structure.

Figure 1:
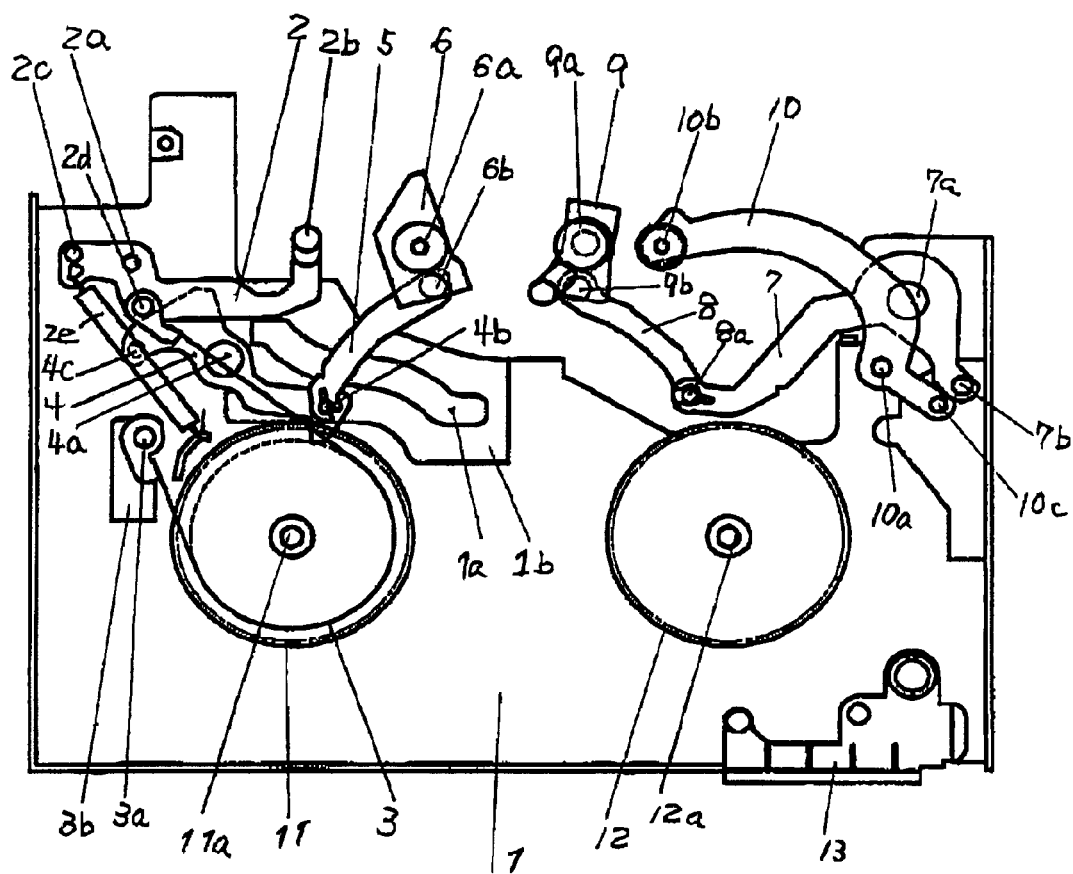
FIG. 1 is a plan view of a sub chassis of a magnetic recording and reproduction apparatus according to the present invention.

First, a structure of a sub chassis 1 of the magnetic recording and reproduction apparatus will be described. FIG. 1 is a plan view of the sub chassis 1.

A sub chassis 1 has a TR arm 2, an S boat 6, a T boat 9 and a T3 arm 10 provided thereon. These tape pull-out members 2, 6, 9 and 10 act to pull out a magnetic tape (not shown in FIG. 1) from a tape cassette.

The TR arm 2 is supported so as to be pivotable about a support 2a on the sub chassis 1. A TR post 2b is provided on a top surface of one end of the TR arm 2, and a TR arm driving pin 2c is provided on a bottom surface of the other end of the TR arm 2.

The T3 arm 10 is supported so as to be pivotable about a support 10a on the sub chassis 1. A T3 post 10b is provided on a top surface of one end of the T3 arm 10, and a T3 arm driving pin 10c is provided on a bottom surface of the other end of the T3 arm 10.

An S arm 4 is supported so as to be pivotable about a support 4a on the sub chassis 1. An S arm driving pin 4a is provided on a bottom surface of one end of the S arm 4, and an S link pin 4b is provided on a top surface of the other end of the S arm 4.

An S link 5 is pivotably attached to the S link pin 4b at one end of the S link 5. The S boat 6 is pivotably attached to the other end of the S link 5 via a boss 6b.

A T arm 7 has substantially the same structure as that of the S arm 4. Specifically, the T arm 7 is supported to be pivotable about a support 7a on the sub chassis 1. A T arm driving pin 7b is provided on a bottom surface of one end of the T arm 7, and a T link pin 8a is provided on a top surface of the other end of the T arm 7.

A T link 8 is pivotably attached to the T link pin 8a at one end of the T link 8. The T boat 9 is pivotably attached to the other end of the T link 8 via a boss 9b.

The S boat 6 has an S roller post 6a standing thereon for guiding the magnetic tape, and the T boat 9 has a T roller post 9a standing thereon for guiding the magnetic tape.

As described above, all the tape pull-out members 2, 6, 9 and 10 are provided on the sub chassis 1.

An S reel stand 11 and a T reel stand 12 are supported so as to be pivotable about a shaft 11a and a shaft 12a, respectively. The S reel stand 11 and the T reel stand 12 are engaged with respective reel hubs of the tape cassette (not shown) when the tape cassette is mounted on the sub chassis 1. This engagement allows the magnetic tape to be taken in.

A brake band (TR band) 3 for controlling the tension of the magnetic tape while the magnetic tape is running is wound around the S reel stand 11. One end of the TR band 3 is supported about a pivotable member 2d of the TR arm 2, and the other end of the TR band 3 is supported about a pivotable member 3a on the sub chassis 1. While the magnetic tape is running, a load acts on the S reel stand 11 via the TR band 3 by a force of a TR spring 2e attached to the TR arm 2.

In a sub chassis adjusting plate 1b, a groove 1a (cam groove) is formed. The sub chassis adjusting plate 1b is secured to the sub chassis 1 by a screw (not shown).

Figure 2:
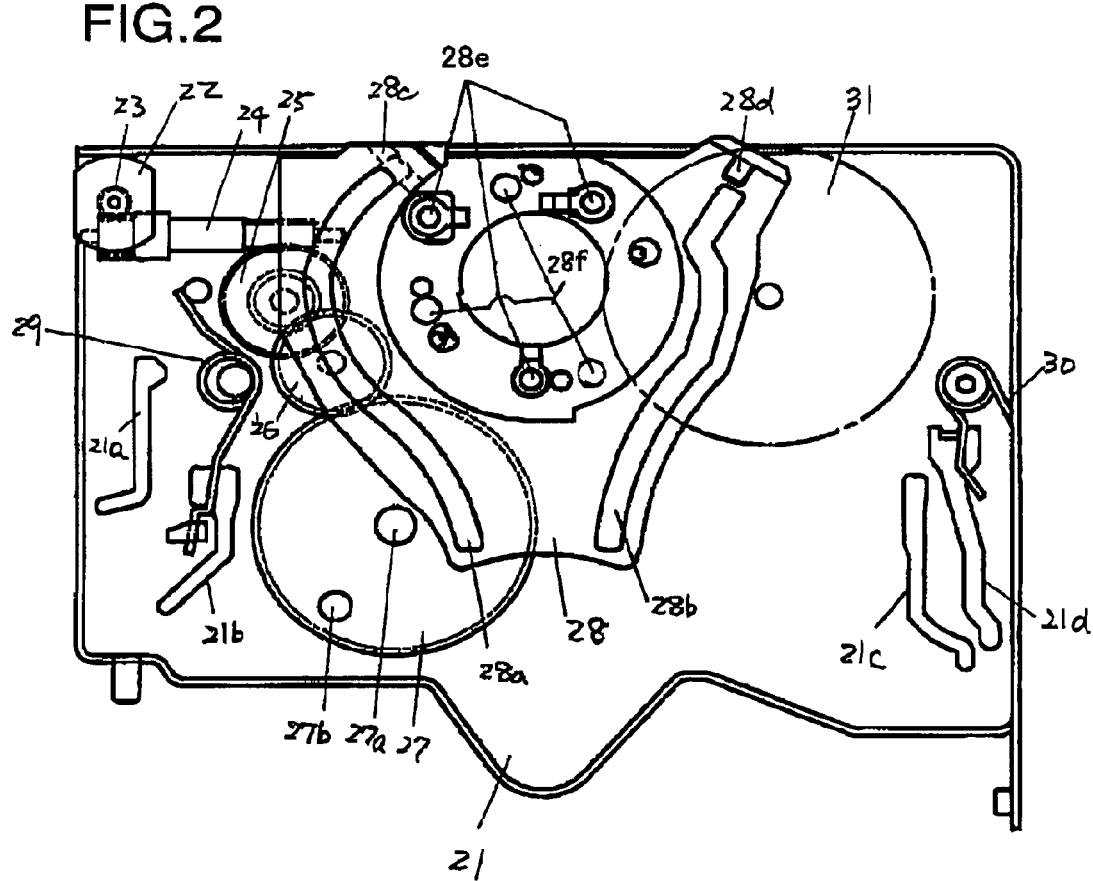
FIG. 2 is a plan view of a main chassis of the magnetic recording and reproduction apparatus according to the present invention.

Next, a structure of a main chassis 21 of the magnetic recording and reproduction apparatus will be described. FIG. 2 is a plan view of the main chassis 21.

The main chassis 21 has four cam grooves 21a, 21b, 21c and 21d formed therein.

A motor 22 is rotatable forward and backward. A rotation force of the motor 22 is conveyed to a mode gear 27 via a motor worm 23, a connection worm 24, and gears 25 and 26. The mode gear 27 is pivotable about a support 27a. A sub chassis driving pin 27b is provided on a top surface of the mode gear 27. The sub chassis driving pin 27b is engaged with the sub chassis 1 (FIG. 1), so that the sub chassis 1 is movable relative to the main chassis 21.

A cylinder base 28 is secured to the main chassis 21 via three cylinder screw holes 28e. A cylinder (not shown) is provided on the cylinder base 28, and is secured with three cylinder screw holes 28f which are screwed from a rear surface of the cylinder base 28.

Guide grooves 28a and 28b are respectively provided for guiding the S boat 6 and the T boat 9 mounted on the sub chassis 1 when the S boat 6 and the T boat 9 pull out the magnetic tape from the tape cassette. Elastic twisted coil springs 29 and 30 are secured on the main chassis 21 in the state of being provided with a pressure by a prescribed force.

Figure 3:
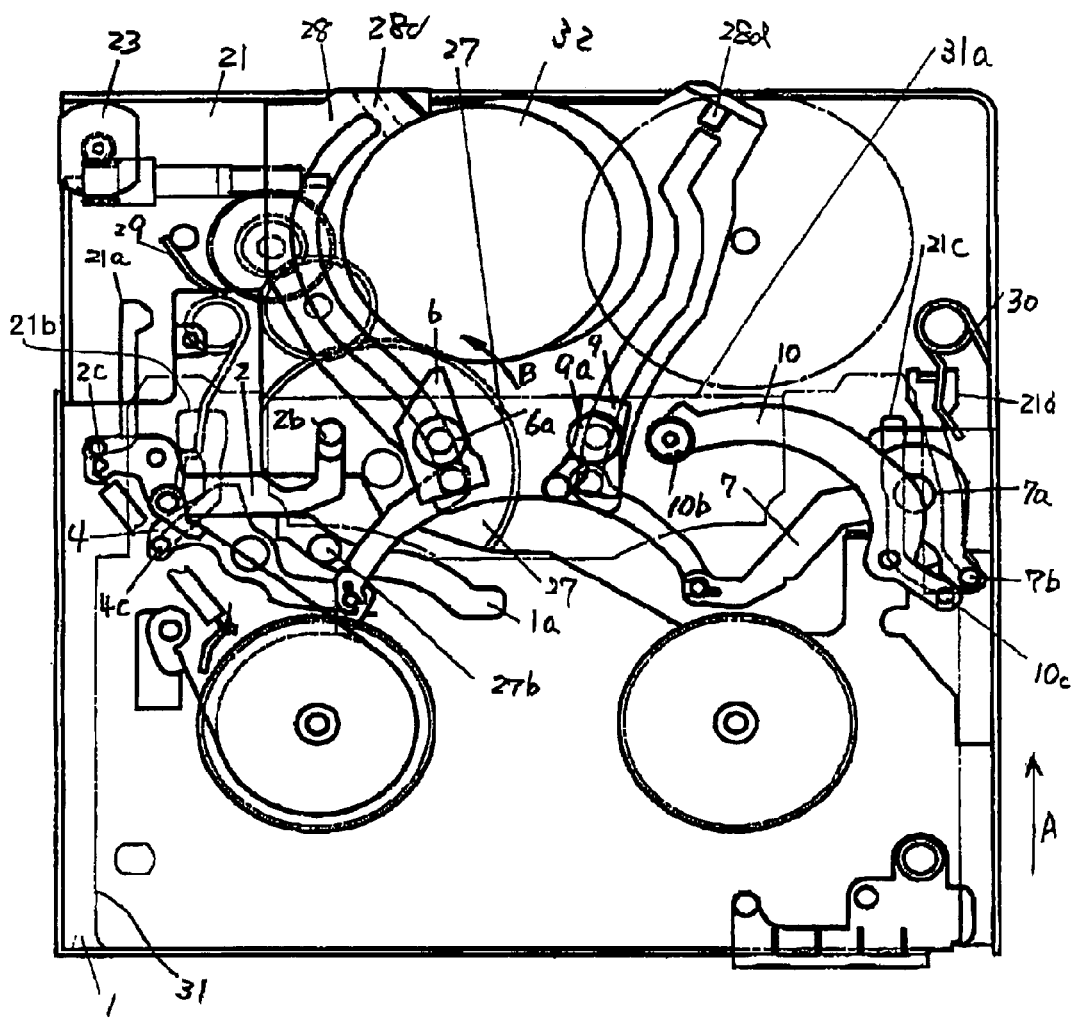
FIG. 3 is a plan view of the magnetic recording and reproduction apparatus according to the present invention in a state where a tape cassette can be mounted on, or taken out from, the sub chassis.
Figure 4:
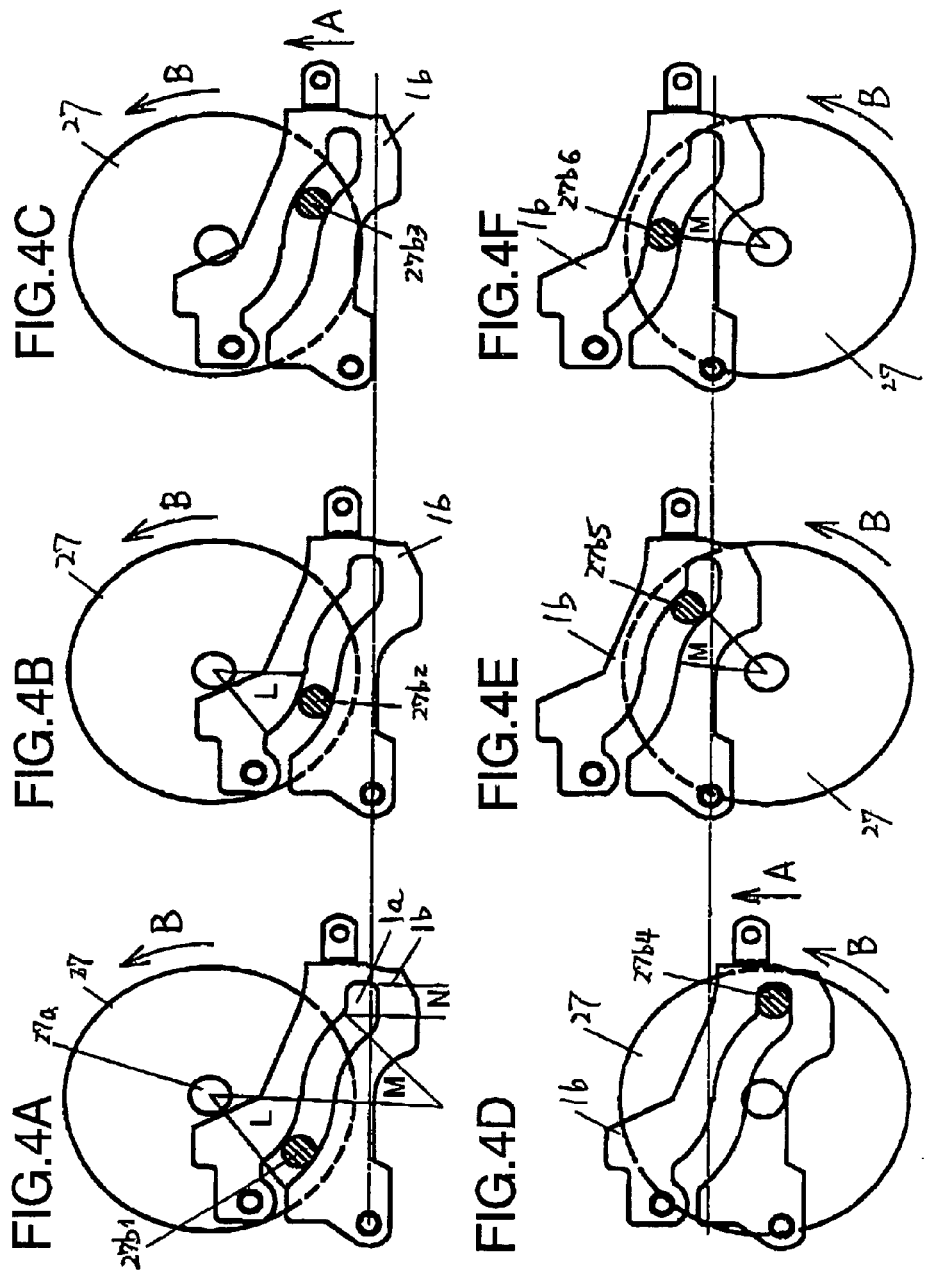
FIGS. 4A through 4F are plan views illustrating an operation of the sub chassis of the magnetic recording and reproduction apparatus according to the present invention.

FIG. 3 is a plan view of the magnetic recording and reproduction apparatus according to the present invention, which is obtained by placing the sub chassis 1 shown in FIG. 1 on the main chassis 21 shown in FIG. 2.

In FIG. 3, the magnetic recording and reproduction apparatus is in the state where a tape cassette can be mounted on, or taken out from, the sub chassis 1. In FIG. 3, the sub chassis 1 is at a tape cassette mountable position.

The sub chassis 1 is guided so as to be slidable with respect to the main chassis 21 in a direction represented by arrow A. The TR arm driving pin 2c of the TR arm 2 is slidably engaged with the cam groove 21a of the main chassis 21. The T3 arm driving pin 10c of the T3 arm 3 is slidably engaged with the cam groove 21c of the main chassis 21. The S arm driving pin 4c of the S arm 4 is engaged with the cam groove 21b of the main chassis 21. The T arm driving pin 7b of the T arm 7 is engaged with the cam groove 21d of the main chassis 21.

The sub chassis driving pin 27b on the mode gear 27 on the main chassis 21 is engaged with the groove 1a of the sub chassis adjusting plate 1b (FIG. 1).

With reference to FIG. 3, an operation of the magnetic recording and reproduction apparatus according to the present invention will be described.

As described above, in FIG. 3, the magnetic recording and reproduction apparatus is in the state where a tape cassette can be mounted on the sub chassis 1. In this state, the posts 2b, 6a, 9a and 10b of the tape pull-out members 2, 6, 9 and 10 are all inside the perimeter of the magnetic tape 31a, i.e., in the opening of the tape cassette. When the motor 22 rotates in this state, the mode gear 27 pivots in a direction represented by arrow B, and the sub chassis driving pin 27b also moves in the direction of arrow B. As a result, the sub chassis driving pin 27b moves in the groove 1a of the sub chassis adjusting plate 1b, which moves the sub chassis 1 in the direction of arrow A.

With reference to FIGS. 4A through 4F, an operation of the sub chassis 1 driven by the mode gear 27, i.e., an operation of the sub chassis adjusting plate 1b secured to the sub chassis 1 will be described.

In FIG. 4A, the sub chassis driving pin 27b is at a tape cassette take-out position 27b1 (the same position as in FIG. 3). As shown in FIG. 4A, the groove 1a of the sub chassis adjusting plate 1b includes an arc portion L (first arc portion), an arc portion M (second arc portion) continuous with the arc portion L, and a straight portion N continuous with the arc portion M. The arc portion L and the arc portion M have identical radii. The arc portion L and the arc portion M are projected in opposite directions from each other.

In FIG. 4B, the sub chassis driving pin 27b is at a tape cassette insertable position 27b2. The sub chassis driving pin 27b, which is at the position 27b1 in FIG. 4A, has been moved in the arc portion L and is located at the position 27b2 in FIG. 4B. The shape of the arc portion L is the same as the shape of an arc having the center thereof at the support 27a, about which the mode gear 27 is pivotable. The arc portion L is concentric with an arc drawn by the movement of the sub chassis driving pin 27b about the center of the mode gear 27. More specifically, the radius of the arc portion L is the same as the radius of an arc drawn by the center of the sub chassis driving pin 27b when the sub chassis driving pin 27b moves about the center of the mode gear 27. Therefore, the sub chassis adjusting plate 1b does not move in the direction of arrow A. The sub chassis adjusting plate 1b should not move since the sub chassis 1 needs to be paused between when the sub chassis driving pin 27b is at the tape cassette take-out position and when the sub chassis driving pin 27b is at the tape cassette insertable position.

When the mode gear 27 further pivots in the direction of arrow B, the sub chassis driving pin 27b moves to a position 27b3 in the arc portion M as shown in FIG. 4C. In the state of FIG. 4C, the tape is being pulled out from the tape cassette.

Since the arc portion M is not concentric with an arc drawn by the movement of the sub chassis driving pin 27b about the center of the mode gear 27, the sub chassis adjusting plate 1b is pushed by the sub chassis driving pin 27b so as to move in the direction of arrow A. This means that the sub chassis 1 also moves in the direction of arrow A.

When the mode gear 27 further pivots in the direction of arrow B, the sub chassis driving pin 27b reaches a position 27b4, where the sub chassis driving pin 27b is in engagement with the straight portion N, as shown in FIG. 4D. The sub chassis 1 continuously moves in the direction of arrow A. In the state of FIG. 4D, the tape is still being pulled out from the tape cassette.

When the mode gear 27 further pivots in the direction of arrow B, the sub chassis driving pin 27b reaches a stop position 27b5 in the arc portion M as shown in FIG. 4E. In this state, the arc portion M is concentric with an arc drawn by the movement of the sub chassis driving pin 27b about the center of the mode gear 27. More specifically, the radius of the arc portion M is the same as the radius of an arc drawn by the center of the sub chassis driving pin 27b when the sub chassis driving pin 27b moves about the center of the mode gear 27. Therefore, the sub chassis adjusting plate 1b is in a pause without moving in the direction of arrow A.

In the state of FIG. 4E, the sub chassis driving pin 27b is at the stop position 27b5. In this state, the tape has been completely pulled out, and the sub chassis 1 is at the utmost position (a tape pull-out completion position), as described below with reference to FIG. 6. The sub chassis 1 cannot move any further from this state. The mode gear 27 further pivots in the direction of arrow B in order to obtain a play mode in which the magnetic tape can run.

Since the sub chassis driving pin 27b is in the arc portion M which is concentric with an arc drawn by the movement of the sub chassis driving pin 27b about the center of the mode gear 27, the sub chassis adjusting plate 1b does not move in the direction of arrow A. After that, the sub chassis driving pin 27b reaches a play position 27b6 as shown in FIG. 4F. The play position is also referred to as a tape running position.

When the mode gear 27 pivots in the opposite direction from the direction of arrow B, the above-mentioned components also move in the opposite directions from those described above and the sub chassis 1 adjusting plate 1b moves in the opposite direction from the direction of arrow A.

As described above, in a simple structure where the sub chassis driving pin 27b is provided on the mode gear 27 which is pivotable, the sub chassis 1 can be stopped during a prescribed period and subsequently start moving, with the groove 1a of the sub chassis adjusting plate 1b being specifically shaped. Since the width of the groove 1a can be substantially the same as the diameter of the sub chassis driving pin 27b, the sub chassis 1 can be stably driven with no need to provide any extra gap between the groove 1a and the sub chassis driving pin 27b.

With reference to FIGS. 3 through 6, an operation of pulling out the magnetic tape from the tape cassette by relative movement of the sub chassis 1 with respect to the main chassis 21 will be described.

Figure 5:
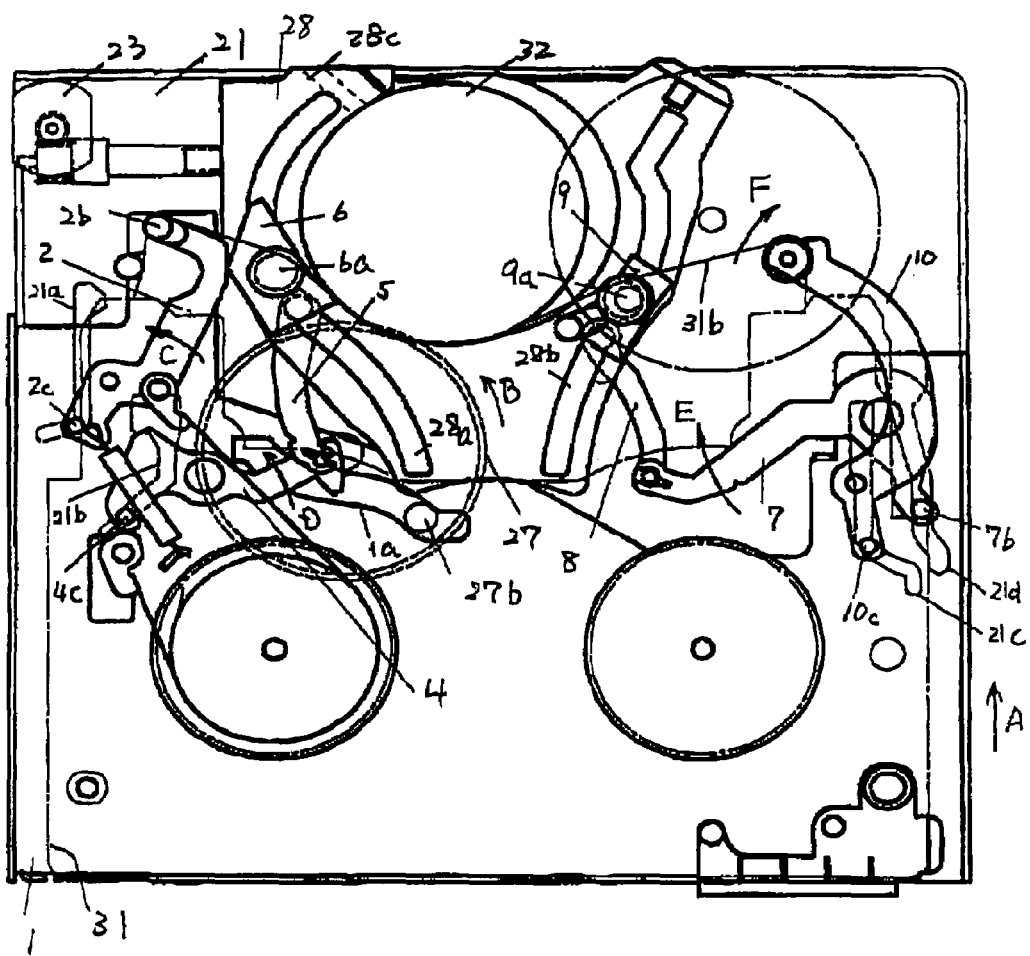
FIG. 5 is a plan view of the magnetic recording and reproduction apparatus according to the present invention in a state where the magnetic tape is being pulled out from the tape cassette.

FIG. 5 shows a state of the magnetic recording and reproduction apparatus where the sub chassis 1 moves in the direction of arrow A by about 5 mm from the state shown in FIG. 3. In FIG. 5, the sub chassis driving pin 27b and the groove 1a of the sub chassis adjusting plate 1b have the positional relationship shown in FIG. 4C. The sub chassis driving pin 27b reaches the position 27b3 shown in FIG. 4C by the movement of the mode gear 27 in the direction of arrow B.

In FIG. 5, as described above, the driving pins 2c, 4c, 7b and 10c of the elements 2, 4, 7 and 10 are respectively in engagement with the cam grooves 21a, 21b, 21d and 21c of the main chassis 21. Owing to such engagements, the elements 2, 4, 7 and 10 respectively pivot in directions represented by arrows C, D, E and F to move to the positions shown in FIG. 5. The S boat 6 and the T boat 9 are respectively guided by the guide grooves 28a and 28b to move to the positions shown in FIG. 5. As a result, the magnetic tape is pulled out to the position as represented by reference numeral 31b.

Figure 6:
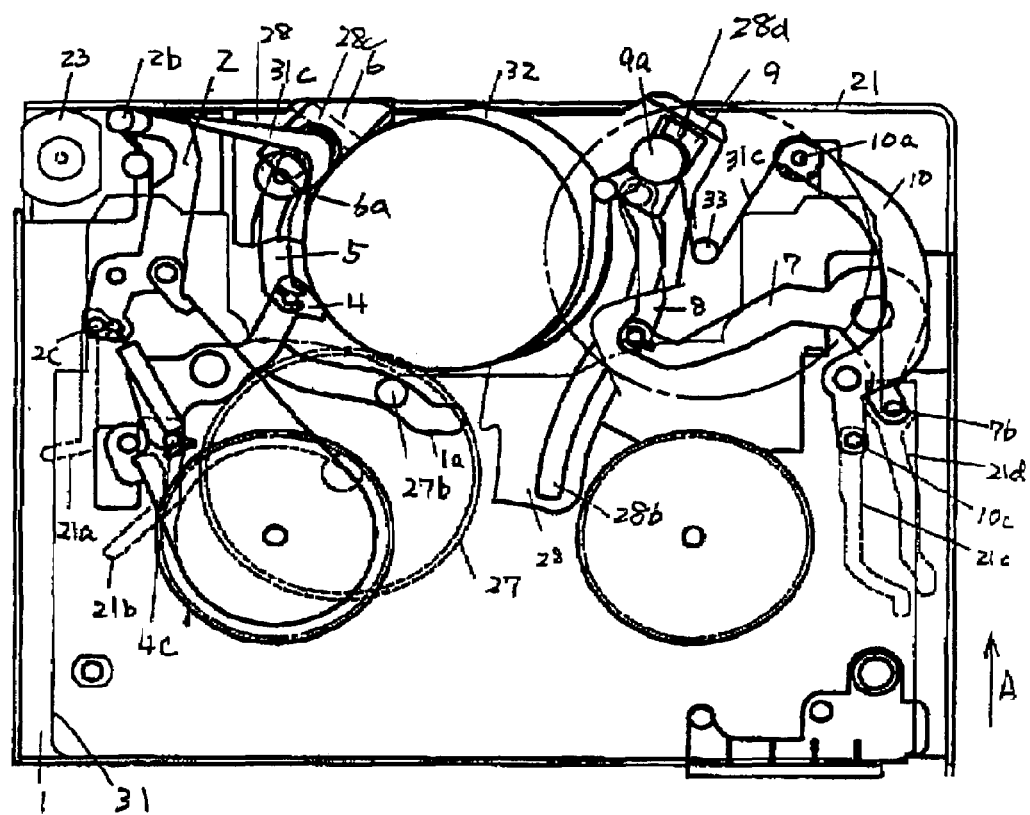
FIG. 6 is a plan view of the magnetic recording and reproduction apparatus according to the present invention in a state where the magnetic tape has been completely pulled out from the tape cassette.

FIG. 6 shows a state of the magnetic recording and reproduction apparatus, in which information recording to, or information reproduction from, the magnetic tape (represented by reference numeral 31c) is possible. The sub chassis 1 is at the tape pull-out completion position. This state is obtained from the state in FIG. 5 as a result of the mode gear 27 further moving in the direction of arrow B, the sub chassis 1 further moving in the direction of arrow A, and the tape 31b being wound around a rotatable head cylinder 32 provided on the cylinder base 28 on the main chassis 21. In FIG. 6, the sub chassis driving pin 27b and the groove 1a of the sub chassis adjusting plate 1b have the positional relationship shown in FIG. 4E. Therefore, the sub chassis 1 stays at this position although the mode gear 27 further pivots in the direction of arrow B, and the pinch roller (not shown) presses the magnetic tape 31c to a capstan shaft 33 and the capstan shaft 33 rotates to place the magnetic recording and reproduction apparatus into the play mode in which the magnetic tape 31c is driven.

In the state shown in FIG. 6, the S boat 6 acting to pull out the magnetic tape from the tape cassette is pressed to a positioning member 28c via the S arm 4 and the S link 5 via the twisted coil spring 29 (FIG. 2) and thus the position of the S boat 6 is determined. Similarly, the T boat 9 also acting to pull out the magnetic tape from the tape cassette is pressed to a positioning member 28d via the T arm 7 and the T link 8 via the twisted coil spring 30 (FIG. 2) and thus the position of the T boat 9 is determined.

With reference to FIGS. 7 and 8A through 8C, such a pressing positioning mechanism will be described.

Figure 7:
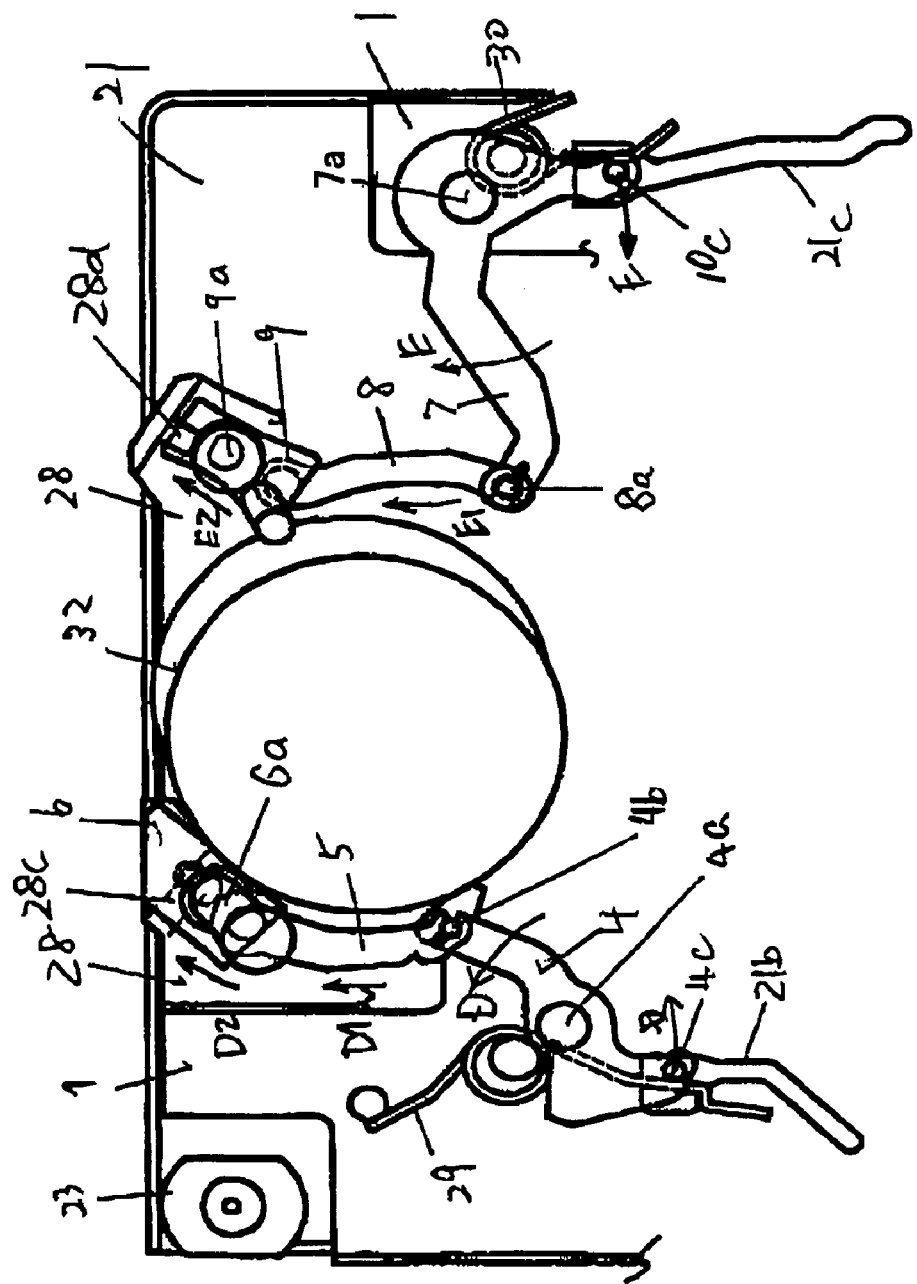
FIG. 7 is a partial view of FIG. 6 illustrating a positioning mechanism of the magnetic recording and reproduction apparatus.

FIG. 7 is a partial view of FIG. 6. With reference to FIG. 7, a method for determining the position of the S boat 6 will be described.

The S arm 4 on the sub chassis 1 reaches the position shown in FIG. 7 by the S arm driving pin 4c being guided by the cam groove 21b in the main chassis 21. In this state, the S arm driving pin 4c is in contact with the elastic twisted coil spring 29 mounted on the main chassis 21. Accordingly, the S arm 4 is pivoted in the direction of arrow D about the support 4a by the force of the twisted coil spring 29. This force presses the S link 5 in a direction of arrow D1 and presses the S boat 6 in a direction of arrow D2. Thus, the S boat 6 is pressed to the positioning member 28c on the cylinder base 28 and thus positioned here. In this manner, the magnetic tape is completely pulled out. Similarly, the T arm 7 is pivoted in the direction of arrow E about the support 7a by the force of the twisted coil spring 30. This force presses the T link 8 in a direction of arrow E1 and presses the T boat 9 in a direction of arrow E2. Thus, the T boat 9 is pressed to the positioning member 28d on the cylinder base 28 and thus positioned here. In this manner, the magnetic tape is completely pulled out. As described above, a pressing mechanism for the S boat 6 and the T boat 9 can be realized simply by elastic coil springs secured to the main chassis 21. A positioning mechanism for each boat can be realized by quite a simple structure. This contributes to the reduction of the number of components, size reduction and improvement in the quality of the tape pull-out mechanism.

Figure 8A:
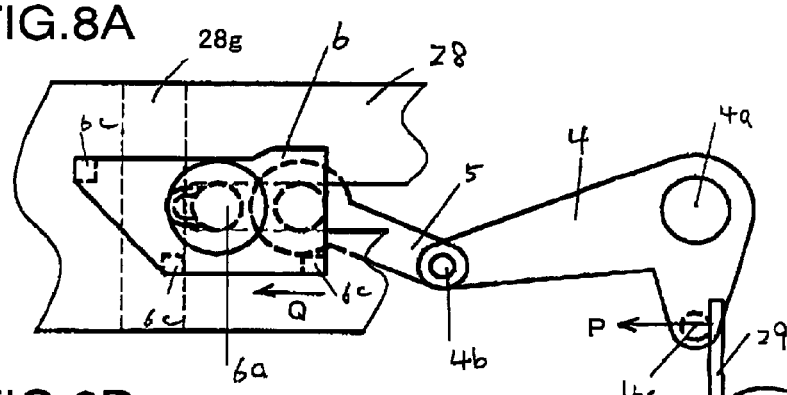
FIG. 8A is a plan view of the positioning mechanism shown in FIG. 7.
Figure 8B:
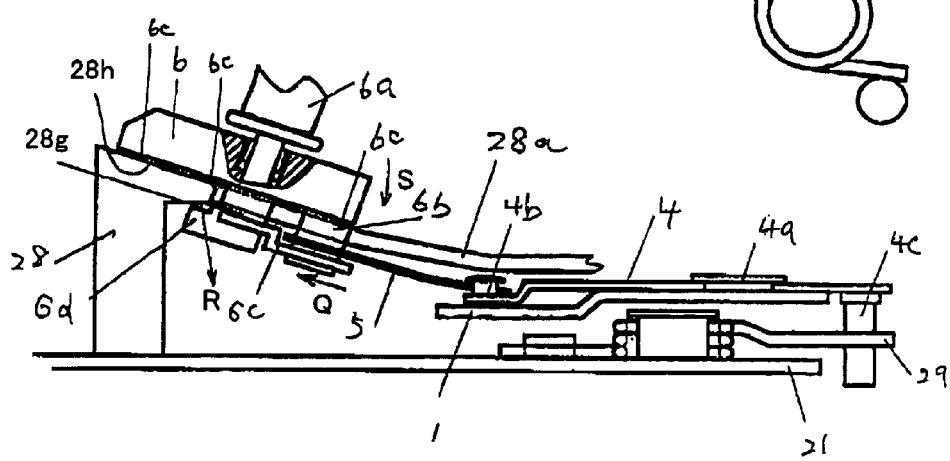
FIG. 8B is a side view thereof.
Figure 8C:
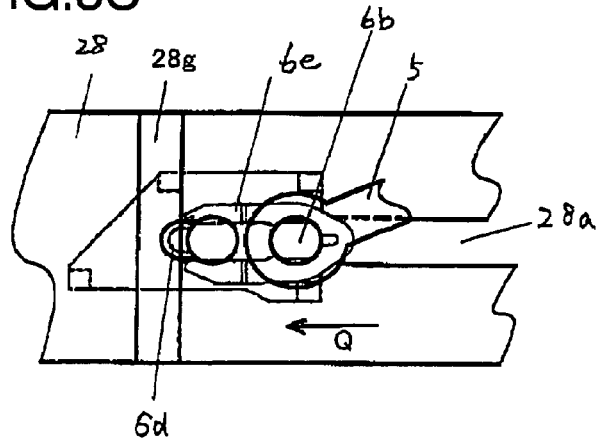
FIG. 8C is a bottom view thereof.

With reference to FIGS. 8A through 8C, the positioning mechanism for the S boat 6 will be described in more detail.

FIG. 8A is a plan view of the positioning mechanism for the S boat 6, FIG. 8B is a side view thereof, and FIG. 8C is a bottom view thereof. In FIGS. 8A through 8C, the elements are shown schematically.

The S arm 4 is urged by the elastic coil spring 29 in a direction represented by arrow P. Thus, a portion of the boss 6b which is below the guide groove 28a is pressed by the S link 5 (FIG. 8B). The S boat 6 includes a projection 6d having a semi-circular planar shape (FIG. 8C) integrally provided at a forward position on the bottom thereof. The cylinder base 28 has a ramp surface 28g on a bottom surface thereof in the vicinity of the cylinder (not shown). The ramp surface 28g is provided such that a normal thereto is in a direction of arrow R.

With reference to FIGS. 8A through 8C, an operation of the positioning mechanism for the S boat 6 will be described.

The lower portion of the boss 6b engaged with the S boat 6 is pressed by the S link 5, and thus the projection 6d of the S boat 6 is pressed to the ramp surface 28g of the cylinder base 28. Accordingly, the entire S boat 6 is pressed in the direction of arrow Q while receiving a force in the direction of arrow R. Since the boss 6b is pressed in the direction of arrow Q, the S boat 6 also receives a force in a direction of arrow S. As a result, three points 6c on a bottom surface of the S boat 6 contact a top surface 28h of the cylinder base 28. The top surface 28h of the cylinder base 28 and the bottom surface of the S boat 6 are formed with high precision. By contact of the top surface 28h of the cylinder base 28 and the bottom surface of the S boat 6, the S boat 6 is positioned with respect to the cylinder base 28 with high precision. As described above, the S boat 6 can be positioned with high precision by a simple structure by integrally providing the projection 6d in the S boat 6 and providing the ramp surface 28g to the cylinder base 28. The S roller post 6a is provided on the S boat 6. The tilt of the S roller post 6a with respect to the main chassis 21 is very important for tape running. Such an important element can be positioned with high precision with a very simple structure. This allows the number of required components and the size of the apparatus to be reduced and also contributes to the improvement of the quality of the apparatus.

The positioning mechanism for the T boat 9 has substantially the same structure and operates in substantially the same manner as described above regarding the S boat 6.

Figure 9:
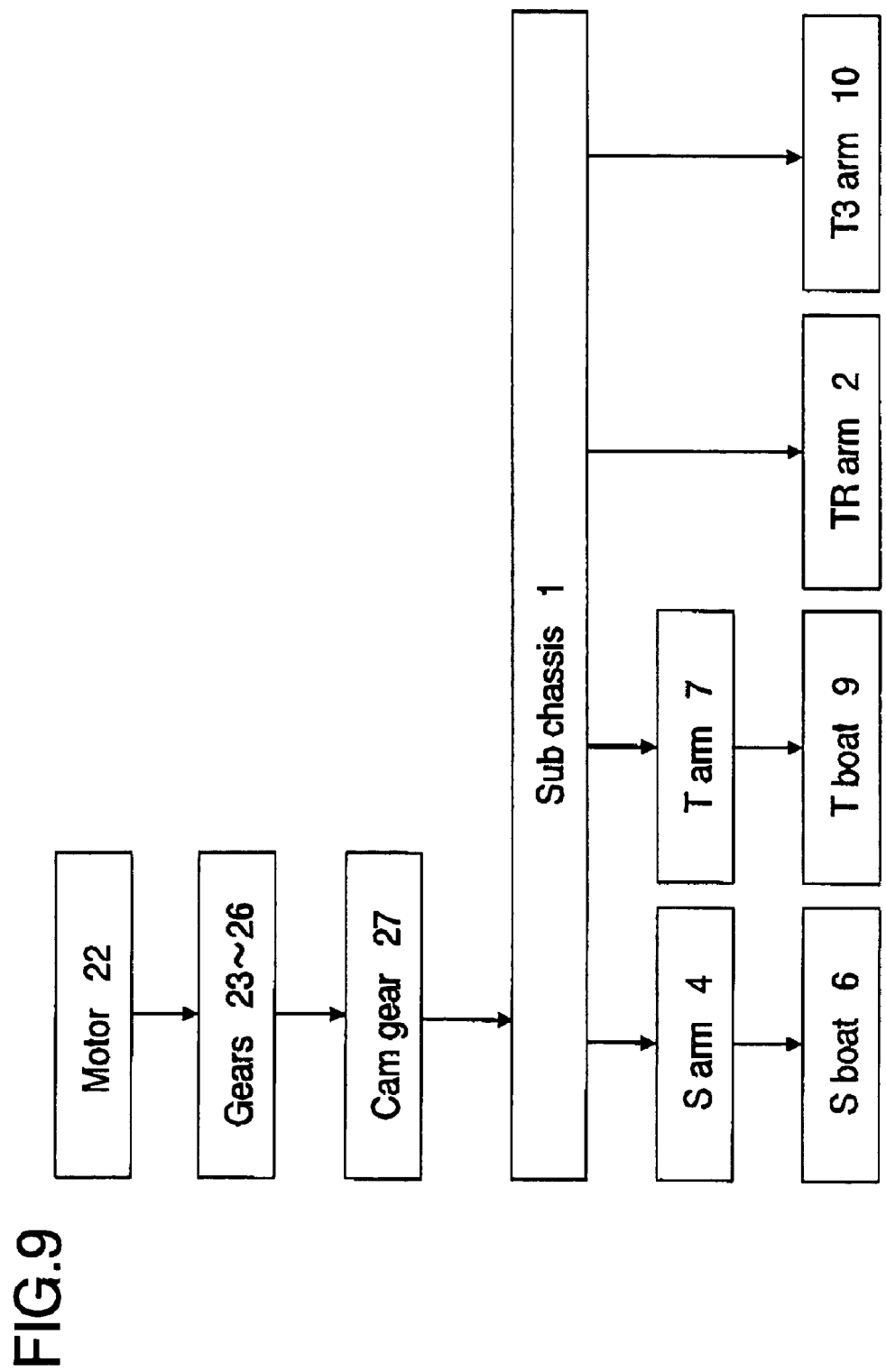
FIG. 9 shows a flow of force generated by a motor of the magnetic recording and reproduction apparatus according to the present invention.

As shown in FIG. 9, the flow of a driving force generated by the motor is streamlined. A simple flow of force by which elements acting for pulling out a magnetic tape from the tape cassette are moved by the movement of the sub chassis is realized.

As described above, according to the present invention, the cam grove 1a provided in the sub chassis 1 is formed to have a specific shape, and the sub chassis driving pin 27b (projection) provided on the mode gear 27 (pivotable body) is directly engaged with the cam grove 1a. Owing to such a structure, the sub chassis driving mechanism, which is a very important part of the sub chassis loading mechanism, has a very simple structure. As a result, the number of components, weight, and size of the sub chassis driving mechanism are reduced. Since the load on the motor is alleviated, a compact and low cost motor can be used. Since the operation of the sub chassis driving mechanism is stabilized, the reliability of the mechanism and of the magnetic recording and reproduction apparatus is improved.

As shown in FIG. 2, the main chassis 21 has an irregular shape. This occurs since the reduction in the number of components generates an extra space in the main chassis 21 and that extra space is eliminated. In this manner, the size of the tape pull-out mechanism is also reduced.

In the above example, the twisted coil springs 29 and 30 are used as elastic members. The same effect is provided by using any elastic members such as, for example, leaf springs or resin springs.

In the above example, the main chassis 21 has four cam grooves. The same effect is provided by forming projections instead of grooves.

As described above, according to the present invention, a pivotable body is provided on the main chassis, and a projection is provided on the pivotable body. The projection is engaged with a cam groove provided in the sub chassis. The width of the cam groove is substantially identical to the diameter of the projection, and the cam groove is formed to have the following specific shape. The cam groove has two arc portions and one straight portion. The two arc portions have identical radii and continuous with each other. The two arc portions are projected in opposite directions to each other. The sub chassis moves reciprocally with respect to the main chassis in accordance with the pivoting of the pivotable body. Thus, the sub chassis driving mechanism, which is an important part of the mechanism for loading the sub chassis, has a very simple structure, which reduces the number of components, weight and size of the sub chassis driving mechanism and also of the magnetic recording and reproduction apparatus. In addition, the load on the motor can be alleviated and thus a compact and low cost motor can be used. Since the operation of the sub chassis driving mechanism is stabilized, the reliability of the mechanism and of the magnetic recording and reproduction apparatus is improved.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magnetic recording and reproduction apparatus, comprising:
   a main chassis having a rotatable head cylinder provided thereon; and
   a sub chassis on which a tape cassette is mountable;
   wherein:
   the sub chassis is movable with respect to the main chassis between a tape cassette mountable position and a tape pull-out completion position, and the tape cassette mountable position is a position at which the tape cassette is mountable on the sub chassis and the tape pull-out completion position is a position at which information recording to, and information reproduction from, the tape which has been pulled out from the tape cassette and wound around the rotatable head cylinder can be performed;

a pivotable body is provided on the main chassis; the pivotable body has a projection provided thereon; and the projection on the pivotable body is engaged with a cam groove in the sub chassis so as to pivot the pivotable body, and thus the cam groove is restricted by the projection on the pivotable body, so that the sub chassis moves with respect to the main chassis;

the cam groove has a width which is substantially identical to the diameter of the projection on the pivotable body; and the cam groove includes a first arc portion, a second arc portion continuous with the first arc portion, and a straight portion continuous with the second arc portion; and the first arc portion and the second arc portion have identical radii, and are projected in opposite directions to each other.

2. A magnetic recording and reproduction apparatus, according to claim 1, wherein when the sub chassis is at the tape cassette mountable position, the projection is engaged with the first arc portion; when the sub chassis is at the tape pull-out completion position, the projection is engaged with the second arc portion; and when the sub chassis is between the tape cassette mountable position and the tape pull-out completion position, the projection is engaged with one of the straight portion and the second arc portion.

3. A magnetic recording and reproduction apparatus, according to claim 1, wherein a radius of an arc passing through the center of the first arc portion in the circumferential direction thereof, a radius of an arc passing through the center of the second arc portion in the circumferential direction thereof, and a radius of an arc drawn by the center of the projection on the pivotable body when the projection on the pivotable body moves about the center of the pivotable body, are identical to each other.

4. A magnetic recording and reproduction apparatus, according to claim 1, wherein:

when the projection is at a tape cassette take-out position, the projection is engaged with the first arc portion at a first position of the first arc portion, and when the projection is at a tape cassette insertable position, the projection is engaged with the first arc portion at a second position of the first arc portion which is different from the first position of the first arc portion; and when the projection is at a tape running position, the projection is engaged with the second arc portion at a first position of the second arc portion, and when the projection is at a stop position, the projection is engaged with the second arc portion at a second position of the second arc portion which is different from the first position of the second arc portion.

* * * * *